United States Patent [19]

Bianchi et al.

[11] Patent Number: 4,760,988
[45] Date of Patent: Aug. 2, 1988

[54] SLIDE STRUCTURE FOR A MOTOR VEHICLE SEAT STRUCTURE

[75] Inventors: François Bianchi, Valentigney; Serge Deley, Seloncourt; François Fourrey, Montbeliard, all of France

[73] Assignee: Cycles Peugeot, Valentigney, France

[21] Appl. No.: 875,814

[22] Filed: Jun. 18, 1986

[30] Foreign Application Priority Data

Apr. 9, 1986 [FR] France .................. 86 05070

[51] Int. Cl.⁴ ................................. B60N 1/08
[52] U.S. Cl. ........................... 248/430; 248/420
[58] Field of Search ............ 248/430, 429, 424, 425, 248/419, 420; 312/339, 340; 384/18, 19

[56] References Cited

U.S. PATENT DOCUMENTS

| | | | |
|---|---|---|---|
| 1,736,108 | 11/1929 | Anderson | 312/339 |
| 3,431,042 | 3/1969 | Pipe | 384/18 |
| 3,450,425 | 6/1969 | Leonhardt | 248/430 |
| 3,450,446 | 6/1969 | Fall | 312/339 |
| 3,464,744 | 9/1969 | Fall | 312/340 |
| 3,631,740 | 1/1971 | Gavagan | 248/430 |
| 4,057,303 | 11/1977 | Rock | 384/19 |
| 4,378,927 | 4/1983 | Graves | 248/430 X |
| 4,483,504 | 11/1984 | Duwelshoft | 248/429 |
| 4,520,982 | 6/1985 | Nishino | 248/430 |
| 4,530,540 | 7/1985 | Hayden et al. | 248/430 X |
| 4,635,890 | 1/1987 | Matsuda et al. | 248/429 |

Primary Examiner—Alvin C. Chin-Shue
Attorney, Agent, or Firm—Sughrue, Mion, Zinn, Macpeak and Seas

[57] ABSTRACT

The movable element of the slide structure is formed at the lower end of a side wall (30) and is bent into an S shape so as to define inside the fixed element two parallel box units (38, 40) in which two sets of rollers are movable, these rollers rolling in their upper part on one element and in their lower part on the other element, the elements being inverted for the two sets. Each roller is moreover carried by a ball (46, 52) which projects laterally and slides on the walls of the box unit, i.e. equally on one side of the fixer element and on the other side of the movable element. A slidable bolt locks the slide structure in the desired position.

10 Claims, 3 Drawing Sheets

SLIDE STRUCTURE FOR A MOTOR VEHICLE SEAT STRUCTURE

Vehicle seat structures capable of being displaced forwardly or rearwardly are increasingly appreciated and there is at the present time a large number of types of slide structures adapted to permit this displacement. However, the forces to which the support of a motor vehicle seat structure is subjected require that the slide structures have great strength and be capable of maintaining their sliding quality under all positions of use. This often results in the construction of excessively rigid devices subjected to high friction, i.e. wear. Now, it is also extremely important to the user to arrange that the slide structure be easy to operate.

An object of the present invention is to satisfy these requirements.

The invention therefore provides a slide structure for a motor vehicle seat structure comprising two sets of rollers which are movable parallely between an outer element and an inner element in which the movable element is formed at the lower end of a side wall by a partition wall which is curved into an S shape and defines inside the fixed element two side-by-side box structures each receiving a set of rollers which roll on one of the elements and under the other element and are each mounted on a central ball in contact on one side of the roller with the partition wall and on the other side with the fixed element.

In such a device, not only are the rollers in contact with both an upper raceway and a lower raceway, one being fixed and the other movable, but the pivotal balls also create a pivoting rolling contact on each side of the rollers so that the elements of the slide structure are always ready to slide one with respect to the other and the actuating force remains small.

Preferably, each set of rollers comprises an elongated carriage which terminates at each of its ends in a fork supporting the pivotal mounting of the roller.

According to a preferred embodiment, the support side wall of the movable element carries a slidable bolt provided with finger members capable of being fitted in succession in notches of the fixed element and of the movable element. Optionally, this bolt may carry a nut for fixing a safety belt or the like.

The following description of an embodiment, given by way of a non-limiting example and shown in the accompanying drawings, will bring out the features and advantages of the invention.

Figure 1:
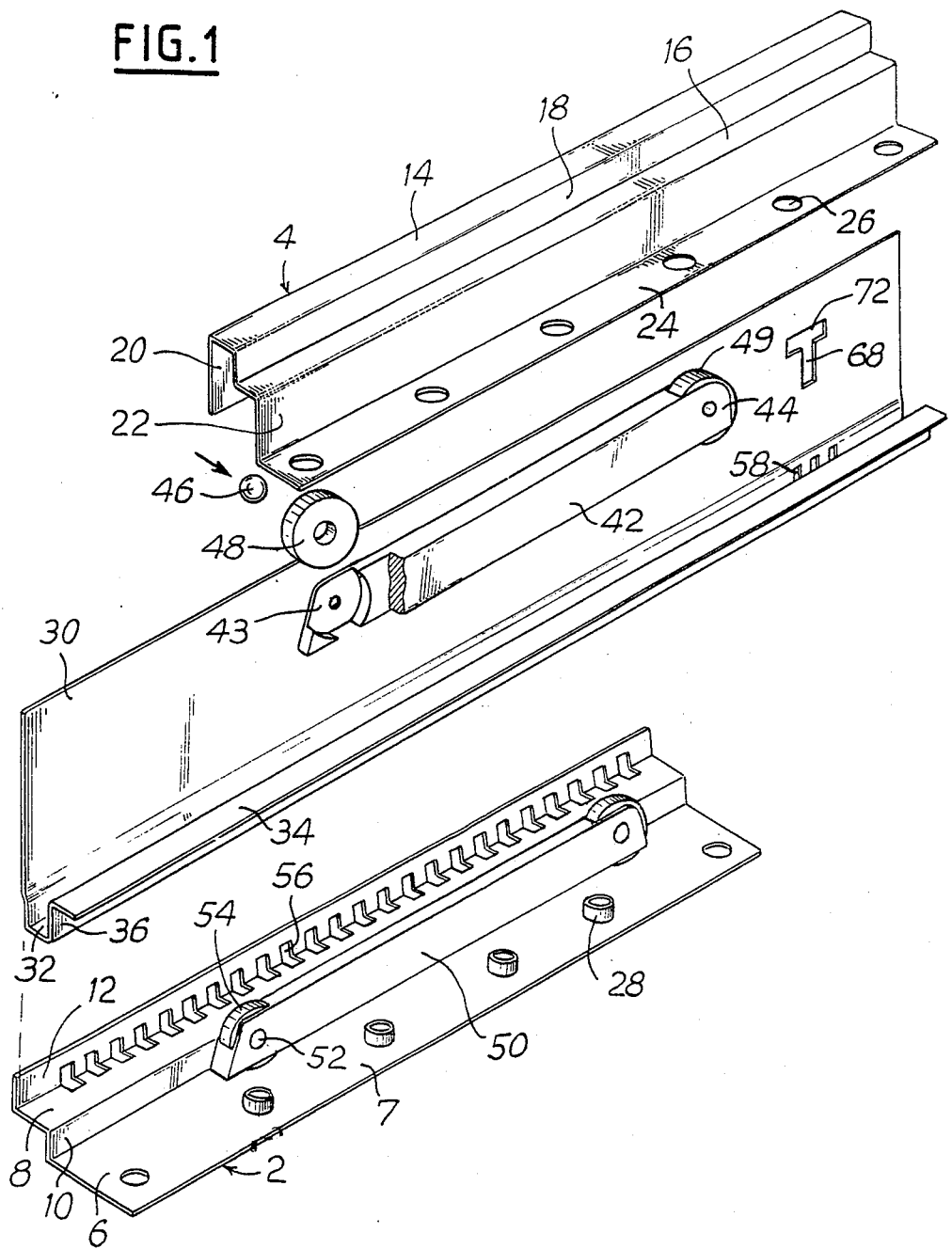
FIG. 1 is an exploded view of a slide structure according to the invention.

As shown in the drawings, a slide structure according to the invention comprises an element 1 in the shape of an elongated channel unit which is fixed to the floor of the vehicle and in which is displaced, through the medium of rollers, a movable element connected to a side wall for fixing it to the seat structure. The element 1 is in fact made in two parts, namely a base 2 and a cap 4 (FIG. 1). The base 2 has two parallel planar surfaces 6 and 8, interconnected by a substantially vertical wall 10.

The surface 8 is extended by an upwardly extending flange 12 and the surface 6 is extended laterally by a fixing strip 7. In the same way, the cap 4 has two parallel planar surfaces respectively 14 and 16, interconnected by a substantially vertical wall 18 of the same height as the wall 10 of the base. Each of the surfaces 14 and 16 is moreover provided externally with a vertical wall, respectively 20 and 22, which extend toward the base 2. A fixing strip 24 parallel to the surfaces 14 and 16 borders the vertical wall 22 and is provided with orifices 26 for the passage of fixing means for fixing the cap 4 both to the base 2 and to the floor of the vehicle. In the illustrated embodiment, the fixing strip 7 of the base 2 carries sleeves 28 adapted to be formed-over around the orifices 26 so as to fix these two elements together and permit the passage of screws or other means for fixing the base to the floor.

The channel element 1 thus formed is practically closed and merely includes a longitudinal slot between the vertical wall 20 of the cap 4 and the flange 12 of the base 2. Extending into this slot is the lower end portion of a side wall 30 which is connected to the seat structure to be displaced. This lower end portion is curved and forms inside the element 1 an S-shaped partition wall having two planar flange portions 32 and 34 respectively, the flange portion 32 being parallel to the surface 8 of the base, and the flange portion 34 being parallel to the planar surface 14 of the cap but disposed at a small distance respectively above and below these surfaces. The planar flange portions 32 and 34 are interconnected by a vertical intermediate wall portion 36 which defines in the channel element 1 two parallel box units, respectively 38 and 40, each containing a set of rollers and located on opposite sides of the partition wall.

Figure 2:
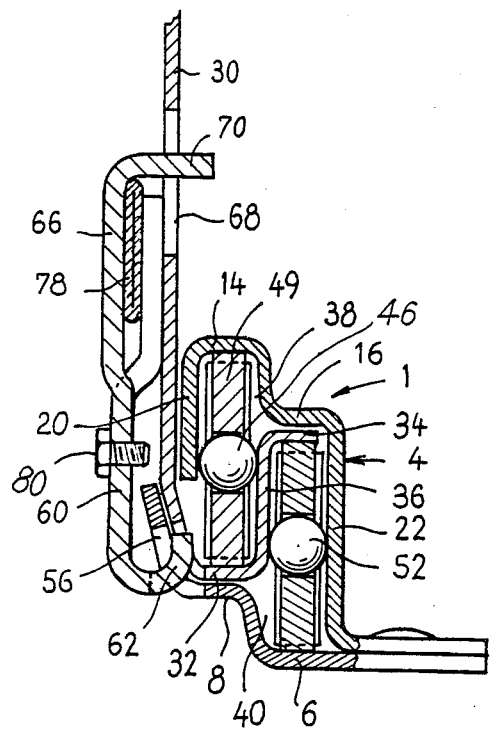
FIG. 2 is a sectional view, taken on line II—II of FIG. 3, of the assembled slide structure.

Mounted inside the box unit 38 is indeed a carriage 42 formed by a solid bar terminating at its two ends in a fork respectively 43 and 44, which supports a ball 46 on which is rotatively mounted a roller 48, 49 by a centre bore in the roller in which the ball is engaged, as shown more particularly in FIG. 2. The diameter of the ball 46 is greater than the width of the carriage 42, so that this ball bears against the two lateral opposed walls of the box unit, i.e. against the vertical wall 20 of the fixed element 1, and against the vertical wall 36 of the movable element. The rollers 48, 49 project above and below the bar 42, so that they roll in their lower part on the flange portion 32 of the movable element and in their upper part under the side 14 of the fixed element.

The box unit 40 contains a second carriage 50 similar to the carriage 42 and terminating also in two forks supporting balls 52 for rotatively mounting rollers 54 by centre bores in the rollers in which the respective ball is engaged. The rollers 54 roll along the raceway 6 formed on the base 2, and under the planar side 34 of the movable element, and the balls 52 slide on one side against the partition wall 36 of the fixed movable element, and on the other side along the vertical wall 22 of the fixed element.

Each of the sets of rollers is thus in contact both with two respectively lower and upper raceways and with the lateral walls of the box unit which contains it so that it always remains in sliding contact with the fixed and movable elements even if it is subjected to forces or vibrations, or if it is in a slightly inclined position. Further, the bearing of the two sets of rollers on the fixed and movable elements are inverted so as to ensure a good absorption of the forces and avoid risks of deformation.

The slide structure is therefore extremely reliable in operation and yet requires only a relatively low force. Abutments (not shown) are of course provided at each end of the two box units 38, 40 to prevent the corresponding set of rollers from rolling out of this box unit, while enabling the side wall 30, and consequently the flange portions 32, 34 and the intermediate portion 36, to continue their displacement relative to these rollers.

Preferably, the flange 12 of the fixed base 2 has a series of notches 56 equally spaced apart and constituting locking steps for locking the seat structure in the desired position. The movable element also includes in its lower part, i.e. at the junction between the side wall 30 and the partition wall, a few notches 58, three notches in the illustrated embodiment, of the same shape and the same spacing as the notches 56 in the flange 12. Mounted above the notches 58 is a slidable bolt 60 which bears against the outer surface of the side wall 30 and is provided in its lower part with curved teeth 62 capable of engaging in the notches 58 possibly after having passed through corresponding notches 56.

Figure 4:
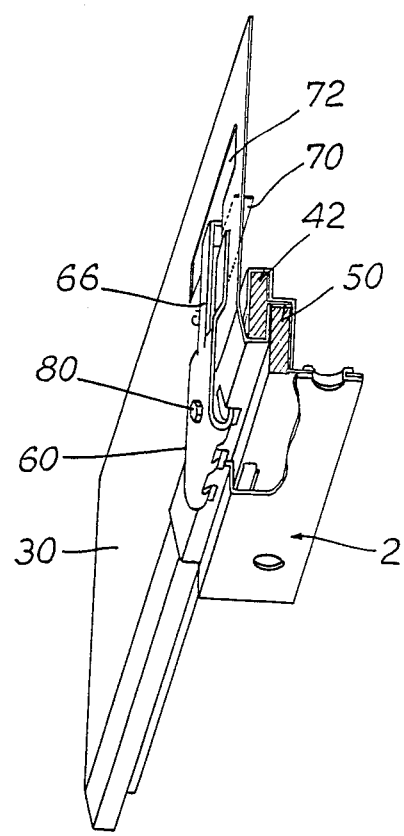
FIG. 4 is a partial bottom view, in the direction of arrow F of FIG. 3, of the slide structure.
Figure 3:
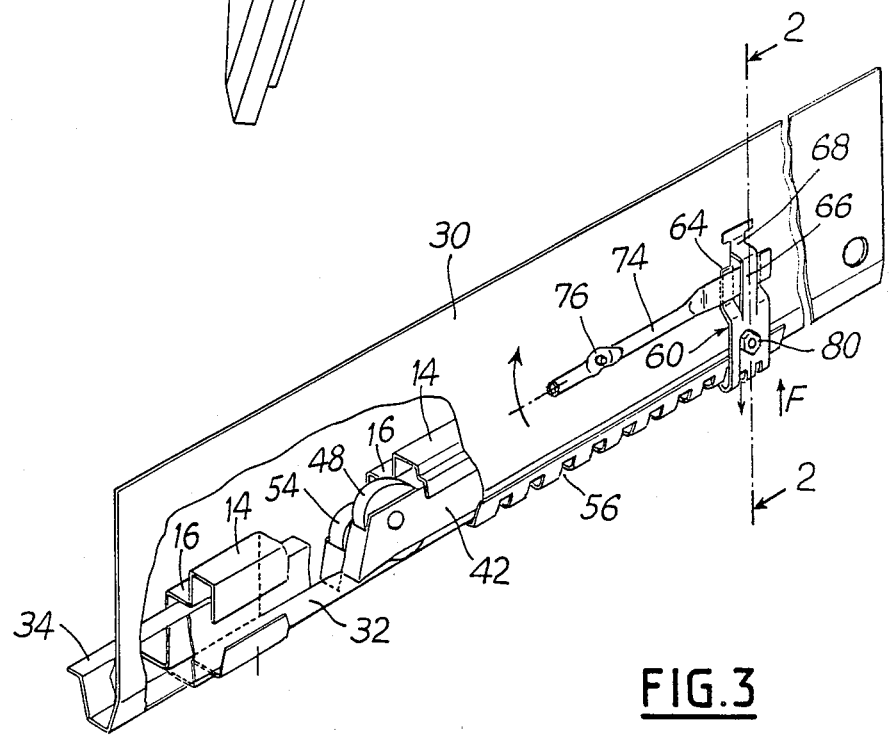
FIG. 3 is a side elevational view, with a part cut away, of the slide structure assembly.

In the illustrated embodiment, the slidable bolt 60 is formed (FIGS. 3 and 4) by a plate which is cut in its upper part so as to constitute two lateral tabs 64 for bearing against the side wall 30 and, therebetween, a strip 66 which is bent so as to extend through a vertical slot 68 in the side wall 30. The strip 66 preferably terminates in a transverse bar 70 which retains the bent portion in the slot 68. Likewise, this slot 68 is extended by a transverse slot 72 which permits the introduction of the bar 70 before it is formed over behind the side wall 30. The control of the sliding of the bolt in the slot 68, i.e. the locking and unlocking of the finger members 62 is, for example, achieved by means of a lever 74 (FIG. 3) which is povitally connected at 76 to the side wall 30 and is flattened in its end portion remote from this pivotal connection so as to extend between the strip 66 and the bearing tabs 64 so as to drive the bolt 60 upwardly or dowardly, depending on whether it is desired to lock or unlock the slide structure.

Preferably, the bolt 60 supports a nut for fixing a safety belt which is thus displaced with the side wall 30, i.e. with the seat when the latter is being adjusted in position. This adjustment may of course be effected manually after unlocking by means of the lever 74 or automatically, for example by means of an electric control device.

What is claimed is:

1. A slide structure for a motor vehicle seat structure, said slide structure comprising an outer fixed element and an inner movable element which includes a side wall, two sets of rollers movable parallely between the outer element and inner element, each roller having a centre bore, the inner movable element being formed at a lower end of said side wall and constituted by a partition wall which has an upper flange portion, a lower flange portion and a substantially upright intermediate flange portion interconnecting said upper flange portion and lower flange portion, said upper and lower flange portions and said intermediate portion defining a substantially S-sectioned shape, said partition wall defining inside the outer fixed element two box units in laterally side-by-side relation to each other on opposite sides of the partition wall, a set of said rollers being disposed in each box unit and in rolling engagement with one of said elements and in rolling engagement with and disposed under the other element of said elements, and a central ball inserted in said bore of each roller, on which ball the respective roller is rotatively mounted, each ball being in contact, on one side of the respective roller, with the partition wall and, on an opposite side of the respective roller, with the fixed element, the fixed element comprising a base having a first planar portion and a second planar portion parallel to and vertically spaced from the first planar portion and forming a lower raceway for one of said sets of rollers, and a cap which provides an upper and lateral cover for the two sets of rollers and has a first further planar portion and a second further planar portion parallel to and vertically spaced from said first further planar portion and forming an upper raceway for the second set of rollers, the balls of the first set of rollers being contained in a vertical plane and a horizontal plane and the balls of said second set of rollers being contained in a vertical plane and a horizontal plane, said horizontal planes and said vertical planes being spaced substantially equal distances apart.

2. A slide structure according to claim 1, wherein a lower portion of the S-shaped partition wall extends above the second planar portion of the fixed base in a direction parallel to said second portion and is in rolling contact with the rollers movable in the box unit.

3. A slide structure according to clam 1, wherein an upper flange portion of the S-shaped partition wall of the movable element extends below the first further planar portion of the cap in a direction parallel to said first further planar portion and is in rolling contact with the rollers which are in rolling contact with the raceway of the base.

4. A slide structure according to claim 1, wherein the fixed element has a base and comprises a flange provided with a series of equally spaced notches and upwardly extending said base of the fixed element.

5. A slide structure according to claim 4, wherein said side wall of the movable element comprises notches and a slidable bolt is mounted on the movable element and terminates in curved teeth capable of penetrating in succession the notches of the fixed element and the notches of the movable element.

6. A slide structure according to claim 5, comprising a slot in said side wall, the bolt being formed by a plate which is bent in an upper end portion so as to be slidable in the slot in said side wall.

7. A slide structure according to claim 5, wherein the bolt carries a nut for fixing a safety belt.

8. A slide structure for a motor vehicle seat structure, said slide structure comprising an outer fixed channel element and an inner movable channel element which includes a side wall, a first set of rollers each having a centre bore and a second set of rollers each having a centre bore and movable parallely between the outer element and inner element by rolling, the inner movable element being integral with a lower end of a said side wall, the inner movable element comprising a partition wall which has an upper flange portion, a lower flange portion and a substantially upright intermediate portion interconnecting said upper flange portion and lower flange portion, said upper and lower flange portions and said intermediate portion defining a substantially S-sectioned shape, said partition wall defining inside the outer fixed element a first box unit and a second box unit, which box units are in side-by-side relation to each other on opposite sides of the partition wall, the first set of rollers being disposed in the first box unit and the second set of rollers being disposed in the second box unit, the outer fixed channel element defining a lower raceway for the second set of rollers in the second box unit and an upper raceway for the first set of rollers in the first box unit and including two opposed spaced-apart lateral wall portions, the upper flange portion of the partition wall defining an upper raceway for the second set of rollers and the lower flange portion of the partition wall defining a lower raceway for the first set of rollers and the intermediate portion of the partition wall extending between said first set and said second set of rollers, a ball being engaged in each centre bore of each roller so that the roller is rotatively mounted on the ball, which ball projects from both sides of the respective roller, the balls of the first set of rollers being contained in a vertical plane and a horizontal plane and the balls of said second set of rollers being contained in a vertical plane and a horizontal plane, said horizontal planes and said vertical planes being spaced substantially equal distances apart, and the balls laterally engaging the respective lateral wall portions of the outer fixed channel element and opposite sides of said intermediate portion of the partition wall.

9. A slide structure according to claim 8, comprising for each set of rollers an elongated carriage terminating at each end in a fork supporting the ball on which the respective roller is rotatively mounted, the roller being laterally supported by the fork and the ball projecting from the fork for contact with said movable element and fixed element.

10. A slide structure according to claim 8, wherein the two box units are parallel to each other and offset from each other in height.

* * * * *